US009285539B2

(12) United States Patent
Zheng et al.

(10) Patent No.: US 9,285,539 B2
(45) Date of Patent: Mar. 15, 2016

(54) POLARIZATION-INSENSITIVE SILICON-PHOTOTONIC OPTICAL RECEIVER

(75) Inventors: Xuezhe Zheng, San Diego, CA (US); Ying L. Luo, San Diego, CA (US); Ashok V. Krishnamoorthy, San Diego, CA (US); Guoliang Li, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 873 days.

(21) Appl. No.: 13/588,261

(22) Filed: Aug. 17, 2012

(65) Prior Publication Data

US 2015/0260914 A1     Sep. 17, 2015

(51) Int. Cl.
| | | |
|---|---|---|
| G02B 6/34 | (2006.01) | |
| G02B 6/12 | (2006.01) | |
| G02B 6/126 | (2006.01) | |
| G02B 6/124 | (2006.01) | |
| G02B 6/293 | (2006.01) | |

(52) U.S. Cl.
CPC ............ *G02B 6/12023* (2013.01); *G02B 6/124* (2013.01); *G02B 6/126* (2013.01); *G02B 6/12007* (2013.01); *G02B 6/29358* (2013.01)

(58) Field of Classification Search
CPC .. G02B 6/12023; G02B 6/2793; G02B 6/293; G02B 6/29358
See application file for complete search history.

(56) References Cited

U.S. PATENT DOCUMENTS

| | | | | |
|---|---|---|---|---|
| 5,809,184 | A * | 9/1998 | Doerr et al. ..................... 385/11 |
| 8,532,446 | B2 * | 9/2013 | Zheng et al. ..................... 385/24 |
| 8,818,194 | B2 * | 8/2014 | Little et al. ..................... 398/82 |
| 8,948,548 | B2 * | 2/2015 | Assefa et al. ..................... 385/11 |
| 9,052,447 | B2 * | 6/2015 | Luo et al. | |
| 2010/0329679 | A1 * | 12/2010 | Little et al. ..................... 398/79 |
| 2013/0136389 | A1 * | 5/2013 | Luo et al. ..................... 385/11 |
| 2014/0064656 | A1 * | 3/2014 | Assefa et al. ..................... 385/11 |
| 2014/0064729 | A1 * | 3/2014 | Assefa et al. ..................... 398/65 |

OTHER PUBLICATIONS

Dirk Taillaert et al., "Compact Efficient Broadband Grating Coupler for Silicon-on-Insulator Waveguides", 2004 Optical Society of America, Dec. 1, 2004, vol. 29, No. 23, Optics Letters, pp. 2749-2751.

Johan Backlund et al., "Input Waveguide Grating Couplers Designed for a Desired Wavelength and Polarization Response", Applied Optics, vol. 41, No. 15, May 20, 2002, pp. 2818-2825.

(Continued)

*Primary Examiner* — Rhonda Peace
(74) *Attorney, Agent, or Firm* — Park, Vaughan, Fleming & Dowler LLP; Steven E. Stupp

(57) ABSTRACT

Using silicon photonic components that support a single polarization, the output of an optical receiver is independent of the polarization of an optical signal. In particular, using a polarization-diversity technique, the two orthogonal polarizations in a single-mode optical fiber are split in two and processed independently. For example, the two optical signals are provided by a polarizing splitting grating coupler. Subsequently, a wavelength channel in the two optical signals is selected using a wavelength-selective filter (for example, using a ring resonator or an echelle grating) and combined at an optical detector (such as a photo-detector) to achieve polarization-independent operation.

12 Claims, 6 Drawing Sheets

(56) References Cited

OTHER PUBLICATIONS

Ashok V. Krishnamoorthy, "Progress in Low-Power Switched Optical Interconnects", IEEE Journal of Selected Topics in Quantum Electronics, vol. 17, No. 2, Mar./Apr. 2011, pp. 357-376.

Zhechao Wang et al., "Experimental Demonstration of a High Efficiency Polarization Splitter Based on a One-Dimensional Grating With a Bragg Reflector Underneath", IEEE Photonics Technology Letters, vol. 22, No. 21, Nov. 1, 2010, pp. 1568-1570.

Dirk Taillaert et al., "A Compact Two-Dimensional Grating Coupler Used as a Polarization Splitter", IEEE Photonics Technology Letters, vol. 15, No. 9, Sep. 2003, pp. 1249-1251.

Wim Bogaerts et al., A Compact Polarization-Independent Wavelength Duplexer Using a Polarization-Diversity SOI Photonic Wire Circuit, 2006 Optical Society of America.

Xuezhe Zheng et al., "Ultralow Power 80 Gb/s Arrayed CMOS Silicon Photonic Transceivers for WDM Optical Links", 2011 IEEE, Journal of Lightwave Technology, vol. 30, No. 4, Feb. 15, 2012, pp. 641-650.

\* cited by examiner with an optical fiber coupling a transmitter chip and a receiver chip. In the transmitter chip, WDM wavelength channels are modulated and multiplexed into an optical waveguide. Then, an optical signal that includes the multiplexed WDM wavelength channels is coupled into a transport optical fiber via an optical waveguide-to-optical fiber coupler. Moreover, at the receiver chip, the WDM optical signals are coupled back to a silicon optical waveguide on the receiver chip. Next, a wavelength de-multiplexer separates the wavelength channels into different receiver channels.

POLARIZATION-INSENSITIVE SILICON-PHOTOTONIC OPTICAL RECEIVER

GOVERNMENT LICENSE RIGHTS

This invention was made with United States government support under Agreement No. HR0011-08-9-0001 awarded by DARPA. The United States government has certain rights in the invention.

BACKGROUND

1. Field

The present disclosure generally relates to the design of integrated circuits. More specifically, the present disclosure relates to an integrated circuit that includes an optical receiver that is insensitive to the polarization of an optical signal.

2. Related Art

Optical interconnects or links based on silicon photonics have the potential to alleviate inter-chip communication bottlenecks in high-performance computing systems that include multiple processor chips and memory chips. This is because, relative to electrical interconnects, optical interconnects offer significantly improved: bandwidth, density, power consumption, size, latency, and range. As a consequence, researchers are investigating optical interconnects based on wavelength division multiplexing (WDM) for use in computing systems.

In many computing systems, relatively long interconnects are often needed, such as the interconnects between: processors, processors and memory, processing nodes, and racks. Typically, optical fiber is used for these long interconnects. FIG. 1 provides a block diagram of an existing optical system, with an optical fiber coupling a transmitter chip and a receiver chip. In the transmitter chip, WDM wavelength channels are modulated and multiplexed into an optical waveguide. Then, an optical signal that includes the multiplexed WDM wavelength channels is coupled into a transport optical fiber via an optical waveguide-to-optical fiber coupler. Moreover, at the receiver chip, the WDM optical signals are coupled back to a silicon optical waveguide on the receiver chip. Next, a wavelength de-multiplexer separates the wavelength channels into different receiver channels.

Because of the high contrast in the index of refraction and wavelength-scale dimensions, silicon optical waveguides on thin silicon-on-insulator are inherently polarization-dependent. Typically, only the transverse-electric (TE) mode is propagated in the optical waveguide, while the transverse-magnetic (TM) mode is highly attenuated. As a consequence, silicon photonic circuits can usually only be designed for a single polarization. However, in most optical fibers the polarization of light is an unknown and changing quantity, which can pose a serious problem for silicon photonic WDM optical interconnects over optical fibers, especially at the receiver chip.

As shown in FIG. 1, with an optical waveguide-to-optical fiber coupler, silicon-on-insulator optical waveguides, and a wavelength de-multiplexer supporting single polarization, the magnitude of the received optical signal will vary depending upon the polarization state of light in the optical fiber. The polarization dependence results in intensity noise that can degrade the performance, and thus the reliability of such a silicon photonic WDM optical interconnect over an optical fiber.

One technique for addressing this problem is to use a polarization-maintaining (PM) optical fiber to control the polarization of light transmission to the receiver chip. However, this approach is often expensive and difficult to implement. In particular, PM optical fibers are usually much more expensive and far less readily available than regular single-mode optical fibers (SMF). Furthermore, the PM optical fiber may need to be keyed at every coupling point to maintain its radial alignment.

Alternatively, the problem can be addressed by using a multimode optical fiber as a natural polarization scrambler. However, while this approach reduces the polarization sensitivity of the receiver chip that supports single polarization, it also introduces significant optical loss when coupling multimode WDM optical signals into silicon-on-insulator optical waveguides.

Hence, what is needed is an optical receiver that does not suffer from the above-described problems.

SUMMARY

One embodiment of the present disclosure provides an optical receiver that includes a polarizing splitting grating coupler (PSGC) having an input port, a first output port and a second output port. The input port receives an input optical signal having two orthogonal polarization components and multiple wavelengths, the first output port provides a first optical signal having a transverse-electric (TE) mode corresponding to one of the two polarization components, and the second output port provides a second optical signal having the TE mode corresponding to the other of the two polarization components. Moreover, the optical receiver includes: a first optical waveguide optically coupled to the first output port; a second optical waveguide optically coupled to the second output port; and a wavelength-selective filter optically coupled to the first optical waveguide and the second optical waveguide. The wavelength-selective filter has output ports that provide output optical signals having the wavelengths in the first optical signal and the second optical signal, where a given output port provides a given output optical signal having a given wavelength in one of the first optical signal and the second optical signal. Furthermore, optical detectors, optically coupled to the wavelength-selective filter, provide electrical signals corresponding to the output optical signals, where a given optical detector is optically coupled to at least the given output port and provides a given electrical signal corresponding to at least the given output optical signal.

Note that the PSGC may: split the normal-incident input optical signal with arbitrary polarization into the first optical signal and the second optical signal, which are two orthogonal components aligned with the TE modes of two optical waveguides; and couple the first optical signal to the first output port and the second optical signal to the second output port.

In some embodiments, the wavelength-selective filter includes pairs of ring-resonator drop filters optically coupled to the first optical waveguide and the second optical waveguide, and optically coupled to the optical detectors. A first ring-resonator drop filter in a given pair of ring-resonator drop filters may include one of the output ports and may output the given output optical signal having the given wavelength in the first optical signal. Moreover, a second ring-resonator drop filter in the given pair of ring-resonator drop filters may include another of the output ports and may output the given output optical signal having the given wavelength in the second optical signal. Furthermore, the given optical detector may be optically coupled to the first ring-resonator drop filter and the second ring-resonator drop filter.

Additionally, the wavelength-selective filter may include: input ports that couple to the first optical waveguide and the second optical waveguide; a propagation region that conveys the first optical signal and the second optical signal; an optical device that images and diffracts the first optical signal and the second optical signal using a reflective geometry; and the outputs ports, optically coupled to diffraction orders of the optical device, which provide the output optical signals having the wavelengths in the first optical signal and the second optical signal. Note that an incidence angle associated with a given diffraction order of the optical device may be different than a diffraction angle associated with the given diffraction order. Moreover, the optical device may include a diffraction grating on a curved surface. For example, the optical device may include an echelle grating.

In some embodiments, the optical receiver includes: a substrate; a buried-oxide layer disposed on the substrate; and a semiconductor layer disposed on the buried-oxide layer, where the first optical waveguide and the second optical waveguide are included in the semiconductor layer. For example, the substrate may include a semiconductor. Furthermore, the wavelength-selective filter may be included in the semiconductor layer.

Another embodiment provides a system that includes the optical receiver.

Another embodiment provides a method for providing the output optical signals, which may be performed by the optical receiver. During operation, the optical receiver receives the input optical signal having the two orthogonal polarization components and the multiple wavelengths. Then, using the PSGC, the optical receiver splits the two orthogonal polarization components into the first optical signal having the TE mode and the second optical signal having the TE mode, and couples the first optical signal to the first optical waveguide and the second optical signal to the second optical waveguide. Moreover, using the wavelength-selective filter, the optical receiver provides the output optical signals having the wavelengths in the first optical signal and the second optical signal, where the given output optical signal has the given wavelength in one of the first optical signal and the second optical signal. Next, using the optical detectors, the optical receiver outputs electrical signals corresponding to the output optical signals, wherein the given electrical signal corresponds to at least the given output optical signal.

Figure 1:
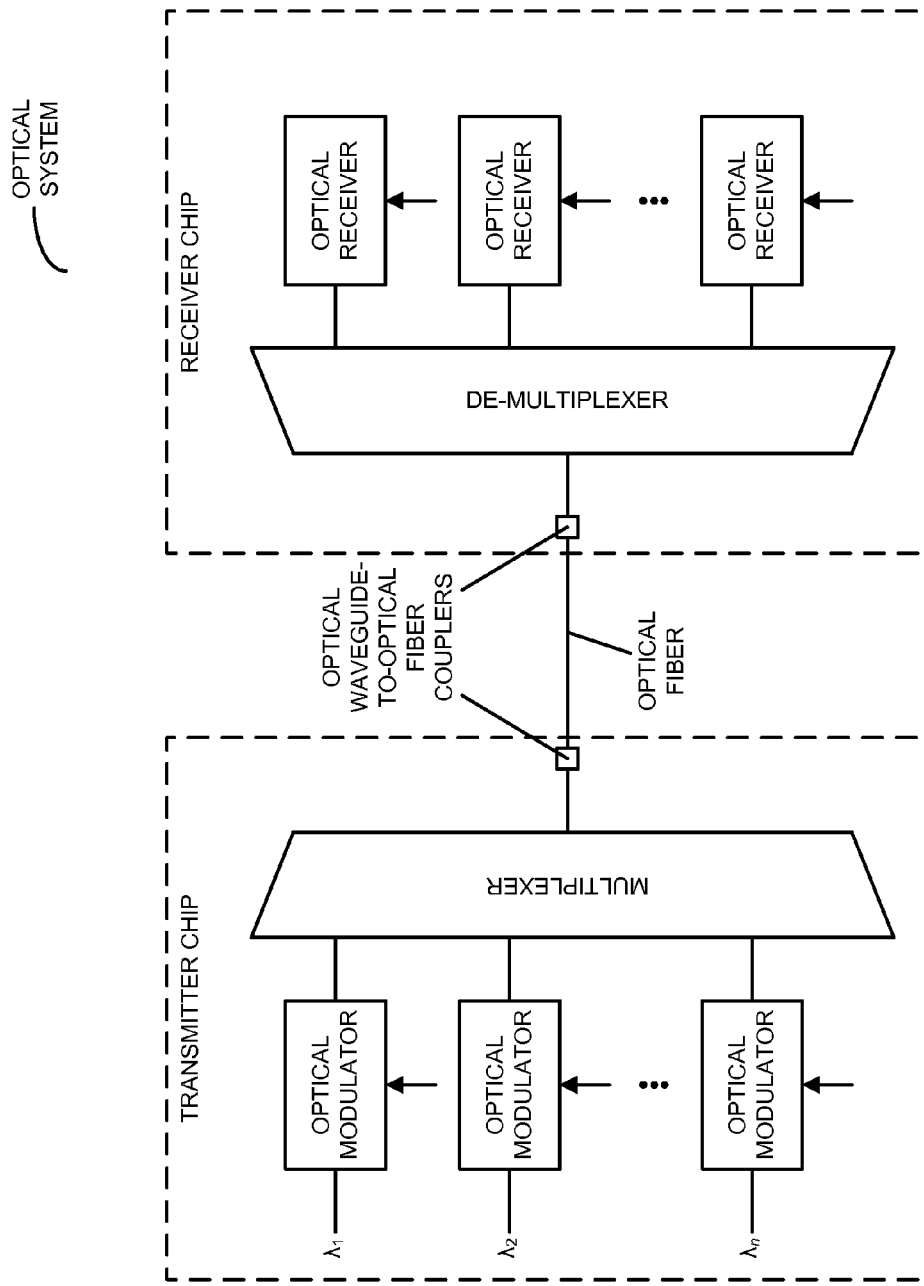
FIG. 1 is a block diagram illustrating an existing optical system.

Table 1 provides design parameters for an echelle grating in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an optical receiver, a system that includes the optical receiver, and a method for providing output optical signals are described. Using silicon photonic components that support a single polarization, the output of this optical receiver is independent of the polarization of an optical signal. In particular, using a polarization-diversity technique, the two orthogonal polarizations in a single-mode optical fiber are split in two and processed independently. For example, the two optical signals may be provided by a polarizing splitting grating coupler. Subsequently, a wavelength channel in the two optical signals is selected using a wavelength-selective filter (for example, using a ring resonator or an echelle grating) and combined at an optical detector (such as a photodetector) to achieve polarization-independent operation.

By providing polarization-independent operation, the optical receiver may allow low-cost single-mode optical fibers and low-cost silicon-photonic components to be used in optical interconnects. Moreover, the polarization independence may facilitate the use of wavelength division multiplexing (WDM) in the optical interconnects, thereby significantly improving the performance of the optical interconnects (such as the bandwidth density and the power consumption) and computing systems that include the optical interconnects.

Figure 2:
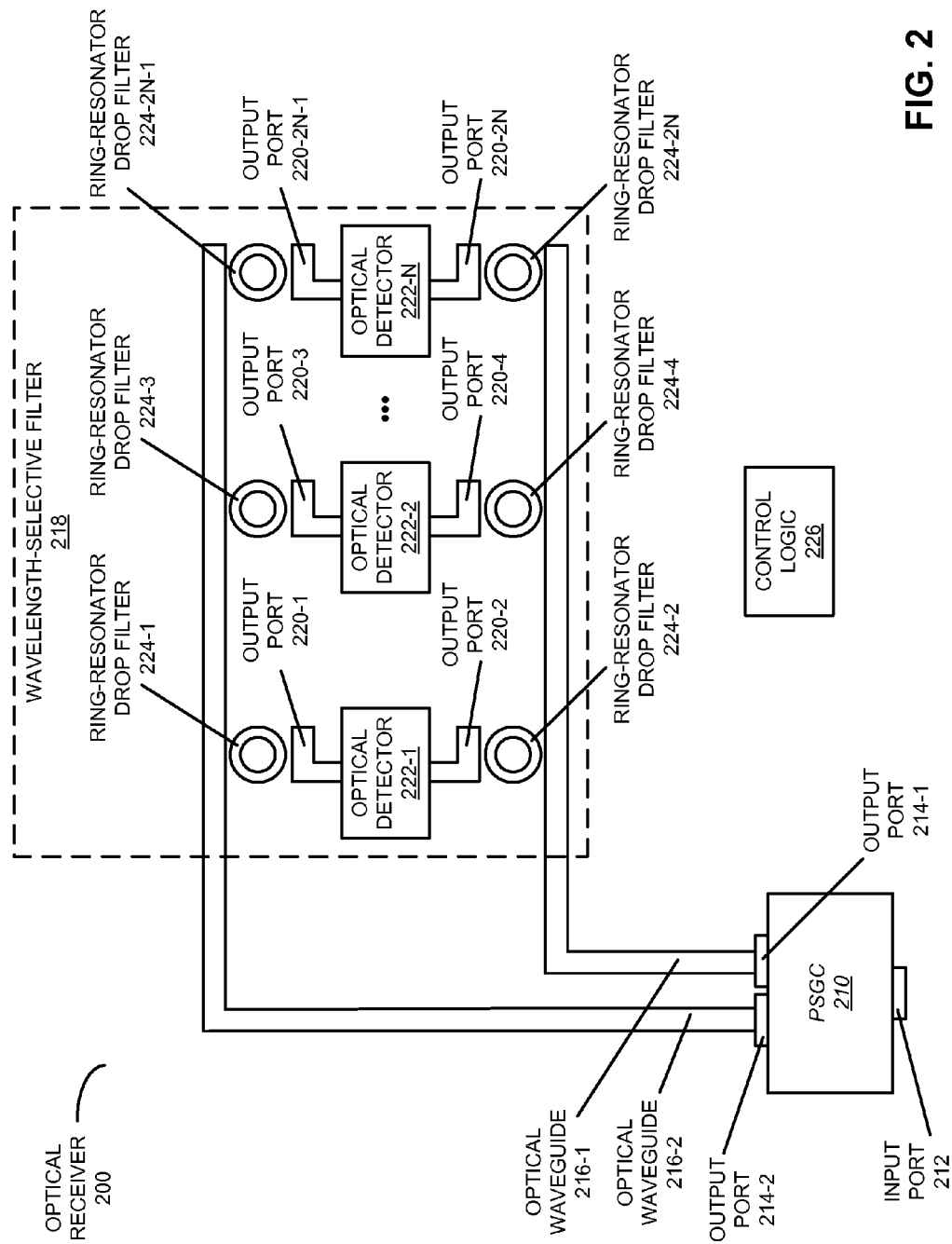
FIG. 2 is a block diagram illustrating an optical receiver in accordance with an embodiment of the present disclosure.

We now describe embodiments of the optical receiver. FIG. 2 presents a block diagram illustrating an optical receiver 200. This optical receiver includes a polarizing splitting grating coupler (PSGC) 210 having an input port 212 and output ports 214. Input port 212 receives an input optical signal having two orthogonal polarization components and multiple wavelengths. For example, the input optical signal may be received via one or more input optical waveguides (not shown) or an optical fiber (not shown). In some embodiments, the optical signal may be associated with a predefined channel spacing (such as those used in WDM). Moreover, output port 214-1 provides a first optical signal having a transverse-electric (TE) mode corresponding to one of the two polarization components and output port 214-2 provides a second optical signal having the TE mode corresponding to the other of the two polarization components.

Furthermore, optical receiver 200 includes: optical waveguide 216-1 optically coupled to output port 214-1; optical waveguide 216-2 optically coupled to output port 214-2; and a wavelength-selective filter 218 optically coupled to optical waveguides 216. Wavelength-selective filter 218 has output ports 220 that provide output optical signals having the wavelengths in the first optical signal and the second optical signal, where a given output port provides a given output optical signal having a given wavelength in one of the first optical signal and the second optical signal. Furthermore, optical detectors 222 (such as photo-detectors), optically coupled to wavelength-selective filter 218, provide electrical signals corresponding to the output optical signals, where a given optical detector (such as optical detector 222-1) is optically coupled to at least the given output port and provides a given electrical signal corresponding to at least the given output optical signal.

Note that the PSGC 210 may: split the normal-incident input optical signal with arbitrary polarization into the first optical signal and the second optical signal, which are two orthogonal components aligned with the TE modes of two optical waveguides; and couple the first optical signal to output port 214-1 and the second optical signal to output port

214-2. In particular, diffraction-grating couplers (which are sometimes referred to as 'grating couplers') can be designed to couple light between a single-mode optical fiber and silicon optical waveguides. In addition, one- or two-dimensional diffraction gratings (which we refer to as 'PSGCs') can work as a coupler and as a polarization splitter that separates the two orthogonal polarization components in a single-mode optical fiber into two different silicon optical waveguides 216. Note that the power in each of optical waveguides 216 is dependent on the state of polarization of the input optical signal. However, the sum of powers in both optical waveguides 216 is essentially constant. Using PSGC 210, a polarization-diversity technique can be implemented to build a polarization-independent optical receiver, that can support WDM and which can be implemented on silicon (i.e., it is a low-cost optical receiver).

As illustrated in FIG. 2, wavelength-selective filter 218 may include a symmetric structure that picks off wavelength channels (such as wavelengths $\lambda_1$ through $\lambda_n$) from the two polarization components in optical waveguides 216 and analog combines them in optical detectors 222 (such as germanium photo-detectors). In particular, pairs of ring-resonator drop filters 224 are optically coupled to optical waveguides 216, and are optically coupled to optical detectors 222. A first ring-resonator drop filter in a given pair of ring-resonator drop filters (such as ring-resonator drop filter 224-1) may include one of output ports 220 (such as output port 220-1) and may output the given output optical signal having the given wavelength in the first optical signal (i.e., the first ring-resonator drop filter may be tuned to the given wavelength). Moreover, a second ring-resonator drop filter in the given pair of ring-resonator drop filters (such as ring-resonator drop filter 224-2) may include another of output ports 220 (such as output port 220-2) and may output the given output optical signal having the given wavelength in the second optical signal (i.e., the second ring-resonator drop filter may also be tuned to the given wavelength). Furthermore, the given optical detector may be optically coupled to the first ring-resonator drop filter and the second ring-resonator drop filter so that, ideally, the power at the given optical detector is the same regardless of how the two orthogonal polarization components are split between optical waveguides 216 (and, thus, independently of the polarization of the input optical signal).

In principal, with careful routing optical waveguides 216 may have the same length (both before and after the ring-resonator drop filters). In addition, the ring-resonator drop filters in each pair may have the same size and coupling condition so that the two orthogonal polarization components arrive at the given optical detector simultaneously. As noted previously, ideally the sum of the optical signals at the given optical detector may then be the same regardless of the polarization state of the input optical signal. In practice, however, the two ring-resonator drop filters may not be perfectly identical (this is likely to be the case the further apart the ring-resonator drop filters are from each other). In this case, the two orthogonal polarization components may experience different optical loss and latency before they are combined at the given optical detector. Furthermore, the tuning and the control of the ring-resonator drop filters (which may be provided by control logic 226) can be time variant and may depend on the power level of the optical signals before and after the ring-resonator drop filters. As a consequence, because of the uncertain and changing power levels in optical waveguides 216, tuning and control of the ring-resonator drop filters may be challenging.

Nonetheless, the approach for providing polarization diversity illustrated in FIG. 2 can be generalized to other optical devices. In particular, a polarization-independent optical receiver can be implemented by placing corresponding identical, symmetric, WDM de-multiplexing optical components in both output arms of PSGC 210 and then optically combining each pair of respective wavelength-de-multiplexed outputs of the corresponding WDM de-multiplexers into a corresponding set of optical detectors.

Figure 3:
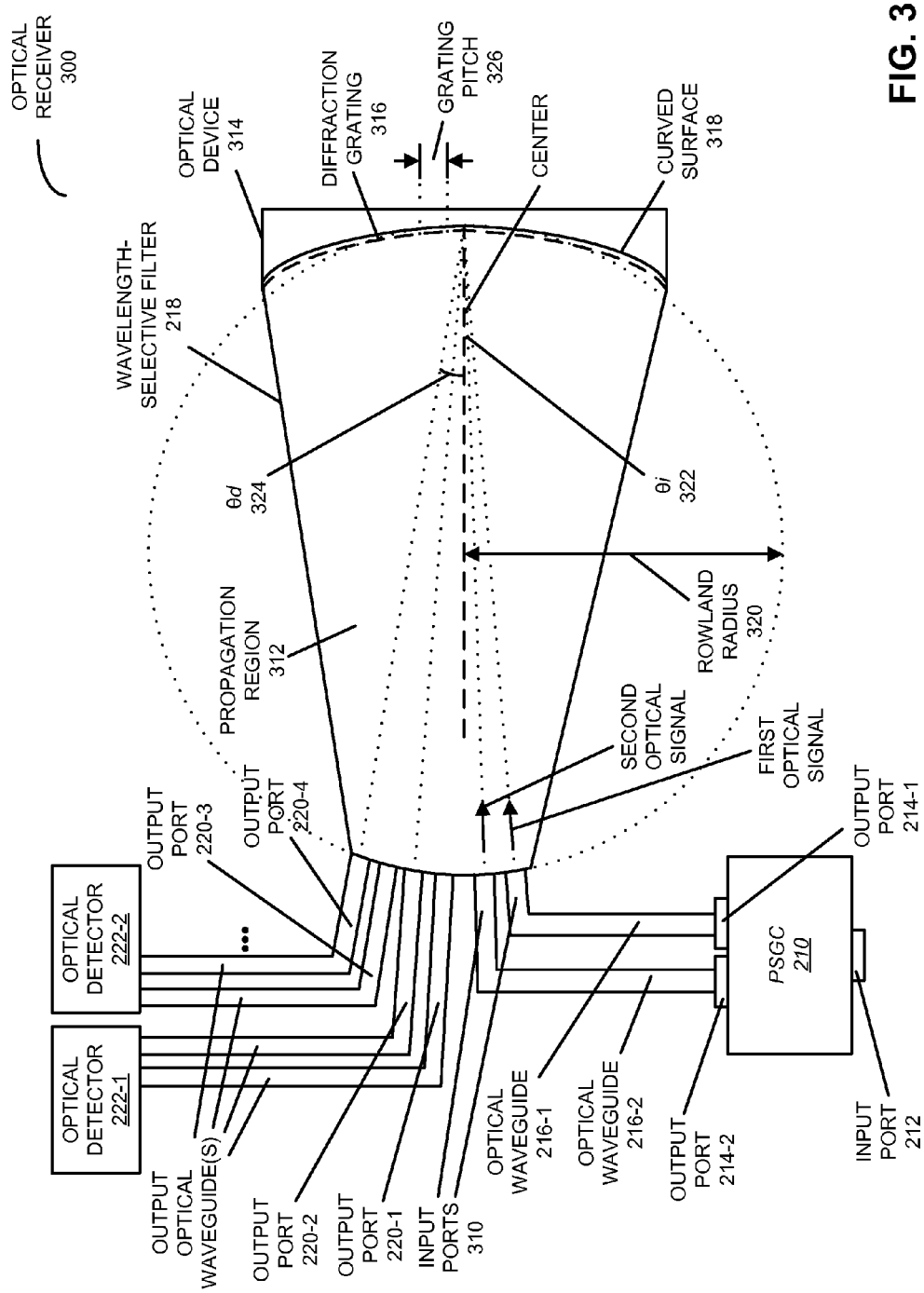
FIG. 3 is a block diagram illustrating an optical receiver in accordance with an embodiment of the present disclosure.

Another embodiment of this approach is illustrated in FIG. 3, which presents a block diagram illustrating an optical receiver 300. In particular, wavelength-selective filter 218 may include: input ports 310 that couple to optical waveguides 216; a propagation region 312 that conveys the first optical signal and the second optical signal; an optical device 314 that images and diffracts the first optical signal and the second optical signal using a reflective geometry; and outputs ports 220, optically coupled to diffraction orders of optical device 314, which provide the output optical signals having the wavelengths in the first optical signal and the second optical signal.

For example, optical device 314 may include a diffraction grating 316 on a curved surface 318 having a radius of twice Rowland radius 320, such as an echelle grating. Thus, an incidence angle ($\theta_i$) 322 associated with a diffraction order may be different than a diffraction angle ($\theta_d$) 324 associated with the diffraction order. Note that grating pitch 326 of diffraction grating 316 may be greater than or equal to 20 μm and/or Rowland radius 320 may be less than 1 mm.

In this way, optical device 314 may de-multiplex the wavelength channels in the first optical signal and the second optical signal, and provide the wavelength channels on output ports 220. The wavelength channels have the same spacing on output ports 220 as in the input optical signal but are separated in space. For example, wavelength (or wavelength channel) $\lambda_1$ on input ports 310 may be output on output ports 220-1 and 220-2. Similarly, wavelength (or wavelength channel) $\lambda_2$ on input ports 310 may be output on output ports 220-3 and 220-4. Each pair of output ports (such as output ports 220-1 and 220-2) may be coupled to a corresponding optical detector (such as optical detector 222-1) where the output optical signals are combined electrically with a magnitude proportional to the sum of the optical power in the pair of output ports. With careful routing of the optical waveguides before and after wavelength-selective filter 218 to ensure that the optical paths for the two orthogonal polarization components have the same length, the two orthogonal polarization components will arrive at the given optical detector simultaneously because their optical paths share the same diffraction grating 316, and because the imaging provided by the echelle grating ensures that optical path length for each pair of output optical signals is identical. Therefore, regardless of the polarization state of the input optical signal, optical detectors 222 will convert the output optical signals from output ports 220 into stable electrical output signals (i.e., optical receiver 300 is polarization independent).

Figure 4:
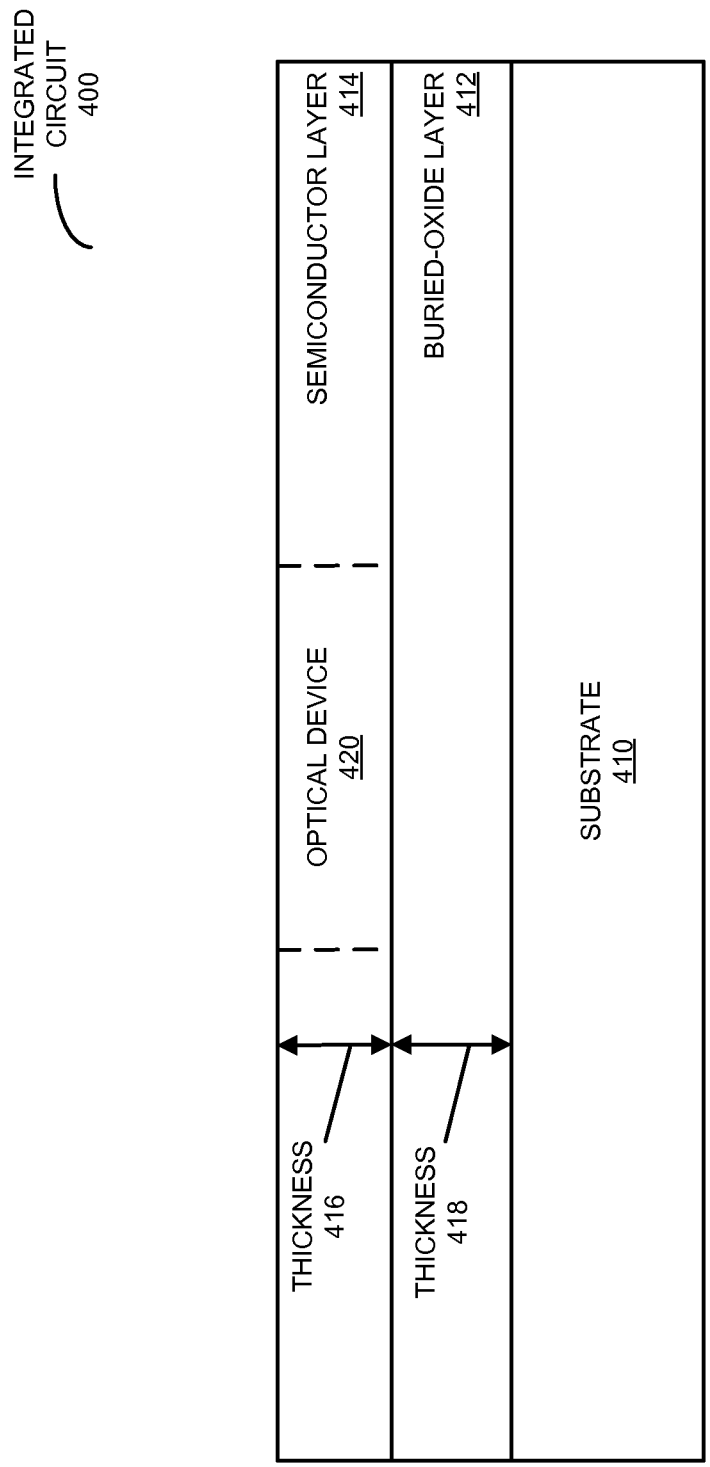
FIG. 4 is a block diagram illustrating a side view of an integrated circuit that includes the optical receiver of FIG. 2 or 3 in accordance with an embodiment of the present disclosure.

As noted previously, the optical receiver may be implemented using silicon-on-insulator (SOI) technology. This is illustrated in FIG. 4, which presents a block diagram illustrating a side view of an integrated circuit 400 that includes optical receiver 200 (FIG. 2) or 300 (FIG. 3). In particular, integrated circuit 400 may include: a substrate 410; a buried-oxide layer 412 disposed on substrate 410; and a semiconductor layer 414 disposed on buried-oxide layer 412. As illustrated by optical device 420, at least optical waveguides 216 (FIGS. 2 and 3) and/or wavelength-selective filter 218 (FIGS. 2 and 3) may be included in semiconductor layer 414.

Note that substrate 410 and/or semiconductor layer 414 may include a semiconductor, such as silicon.

In an exemplary embodiment, the input optical signal has wavelengths between 1.1-1.7 µm, such as an optical signal having a fundamental wavelength of 1.3 or 1.55 µm. Moreover, semiconductor layer 414 may have a thickness 416 that is less than 1 µm (such as 0.25-0.3 µm). Furthermore, buried-oxide layer 412 may have a thickness 418 between 0.3 and 3 µm (such as 0.8 µm).

Furthermore, the parameters for an exemplary design of an echelle grating are provided in Table 1.

TABLE 1

| Channel count | 8 |
| --- | --- |
| Channel spacing (nm) | 1.6 |
| Optical crosstalk (dB) | 20-25 |
| Footprint (µm$^2$) | 500 × 200 |
| Insertion loss | <3 dB |
| Carrier wavelength (nm) | 1550 |
| Free spectral range (nm) | 12.8 |
| Thickness 416 (nm) | 300 |
| Diffraction order | 90 |
| Grating pitch 326 (µm) | 25 |

Figure 5:
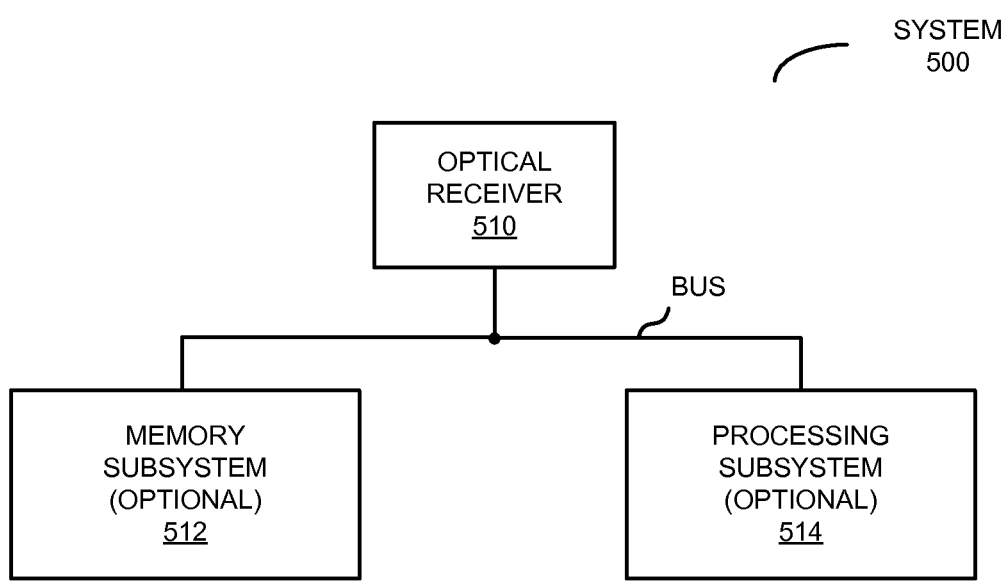
FIG. 5 is a block diagram illustrating a system that includes the optical receiver of FIG. 1 or 2 in accordance with an embodiment of the present disclosure.

The optical receiver may be used in a variety of applications. This is shown in FIG. 5, which presents a block diagram illustrating a system 500 that includes optical receiver 510, such as optical receiver 200 (FIG. 2) or 300 (FIG. 3).

In general, functions of optical receiver 200 (FIG. 2), optical receiver 300 (FIG. 3), integrated circuit 400 (FIG. 4) and system 500 may be implemented in hardware and/or in software. Thus, system 500 may include one or more program modules or sets of instructions stored in an optional memory subsystem 512 (such as DRAM or another type of volatile or non-volatile computer-readable memory), which may be executed by an optional processing subsystem 514. Note that the one or more computer programs may constitute a computer-program mechanism. Furthermore, instructions in the various modules in optional memory subsystem 512 may be implemented in: a high-level procedural language, an object-oriented programming language, and/or in an assembly or machine language. Note that the programming language may be compiled or interpreted, e.g., configurable or configured, to be executed by the processing subsystem.

Components in system 500 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 500 may be at one location or may be distributed over multiple, geographically dispersed locations.

System 500 may include: a VLSI circuit, a switch, a hub, a bridge, a router, a communication system (such as WDM communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, the embodiments of the optical receiver, the integrated circuit and/or the system may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical receiver, the integrated circuit and/or the system may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

Figure 6:
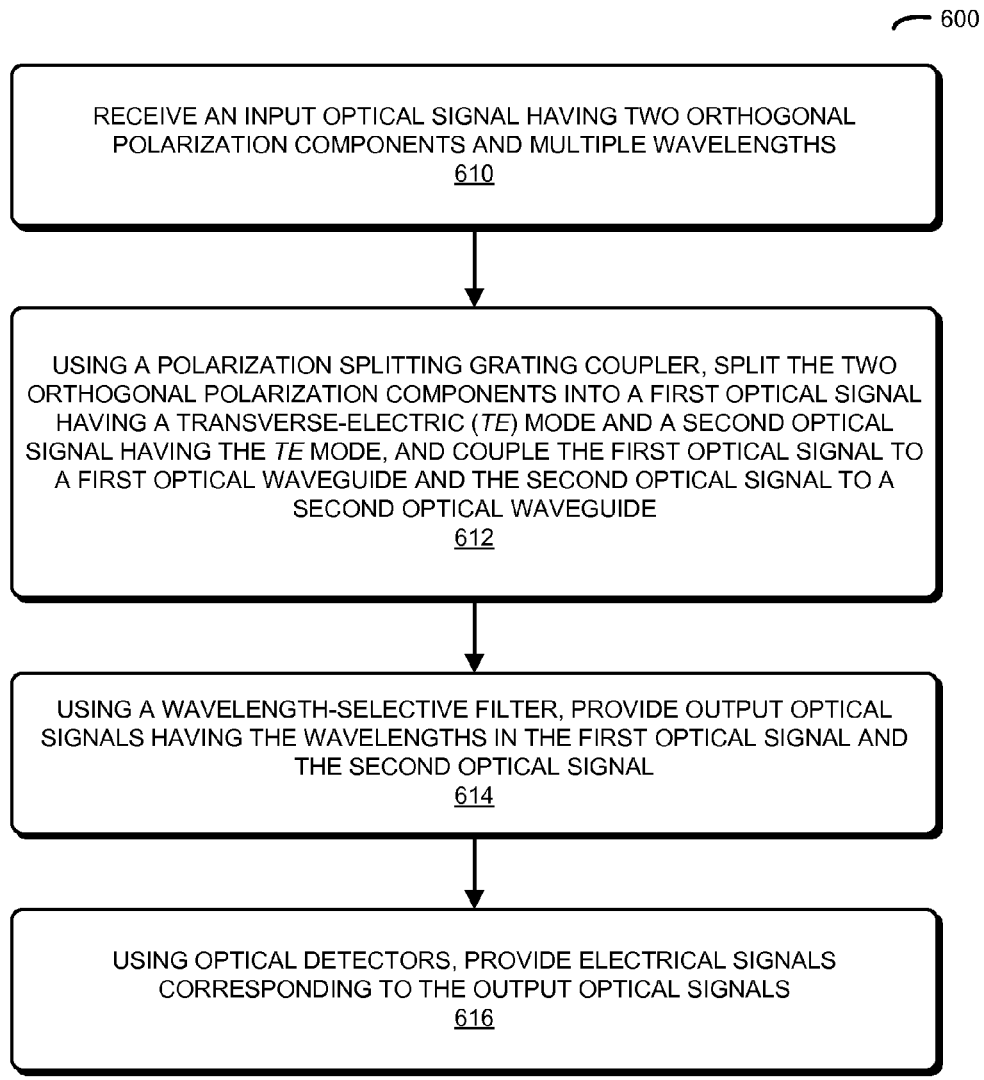
FIG. 6 is a flow chart illustrating a method for providing output optical signals in accordance with an embodiment of the present disclosure.

We now describe embodiments of the method. FIG. 6 presents a flow chart illustrating a method 600 for providing output optical signals, which may be performed by an optical receiver (such as optical receiver 200 in FIG. 2 or 300 in FIG. 3). During operation, the optical receiver receives the input optical signal having the two orthogonal polarization components and the multiple wavelengths (operation 610). Then, using the PSGC, the optical receiver splits the two orthogonal polarization components into the first optical signal having the TE mode and the second optical signal having the TE mode, and couples the first optical signal to the first optical waveguide and the second optical signal to the second optical waveguide (operation 612). Moreover, using the wavelength-selective filter, the optical receiver provides the output optical signals having the wavelengths in the first optical signal and the second optical signal (operation 614), where the given output optical signal has the given wavelength in one of the first optical signal and the second optical signal. Next, using the optical detectors, the optical receiver outputs electrical signals corresponding to the output optical signals (operation 616), wherein the given electrical signal corresponds to at least the given output optical signal.

In some embodiments of method 600 there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical receiver, comprising:
   a polarizing splitting grating coupler (PSGC) having an input port, a first output port and a second output port, wherein the input port is configured to receive an input optical signal having two orthogonal polarization components and multiple wavelengths, and wherein the first output port is configured to provide a first optical signal having a transverse-electric (TE) mode corresponding to one of the two polarization components and the second output port is configured to provide a second optical signal having the TE mode corresponding to the other of the two polarization components;
   a first optical waveguide optically coupled to the first output port;
   a second optical waveguide optically coupled to the second output port;
   a wavelength-selective filter, optically coupled to the first optical waveguide and the second optical waveguide, having output ports configured to provide output optical signals having the wavelengths in the first optical signal and the second optical signal, wherein a given output port is configured to provide a given output optical signal having a given wavelength in one of the first optical signal and the second optical signal, wherein the wavelength-selective filter includes pairs of ring-resonator drop filters optically coupled to the first optical waveguide and the second optical waveguide, and optically coupled to the optical detectors, wherein a first ring-resonator drop filter in a given pair of ring-resonator drop filters includes one of the output ports and is configured to output the given output optical signal having the given wavelength in the first optical signal, and wherein a second ring-resonator drop filter in the given pair of ring-resonator drop filters includes another of the output ports and is configured to output the given output optical signal having the given wavelength in the second optical signal; and
   optical detectors, optically coupled to the wavelength-selective filter, configured to provide electrical signals corresponding to the output optical signals, wherein a given optical detector is optically coupled to at least the given output port and is configured to provide a given electrical signal corresponding to at least the given output optical signal.

2. The optical receiver of claim 1, wherein the PSGC is configured to:
   split the two orthogonal polarization components into the first optical signal having the TE mode and the second optical signal having the TE mode; and
   couple the first optical signal to the first output port and the second optical signal to the second output port.

3. The optical receiver of claim 1, wherein the given optical detector is optically coupled to the first ring-resonator drop filter and the second ring-resonator drop filter.

4. The optical receiver of claim 1, further comprising:
   a substrate;
   a buried-oxide layer disposed on the substrate; and
   a semiconductor layer disposed on the buried-oxide layer, wherein the first optical waveguide and the second optical waveguide are included in the semiconductor layer.

5. The optical receiver of claim 4, wherein the substrate includes a semiconductor.

6. The optical receiver of claim 4, wherein the wavelength-selective filter is included in the semiconductor layer.

7. A system, comprising:
   a processor;
   a memory storing a program module that is configured to be executed by the processor; and
   an optical receiver, wherein the optical receiver includes:
      a polarizing splitting grating coupler (PSGC) having an input port, a first output port and a second output port, wherein the input port is configured to receive an input optical signal having two orthogonal polarization components and multiple wavelengths, and wherein the first output port is configured to provide a first optical signal having a transverse-electric (TE) mode corresponding to one of the two polarization components and the second output port is configured to provide a second optical signal having the TE mode corresponding to the other of the two polarization components;
      a first optical waveguide optically coupled to the first output port;
      a second optical waveguide optically coupled to the second output port;
      a wavelength-selective filter, optically coupled to the first optical waveguide and the second optical waveguide, having output ports configured to provide output optical signals having the wavelengths in the first optical signal and the second optical signal, wherein a given output port is configured to provide a given output optical signal having a given wavelength in one of the first optical signal and the second optical signal, wherein the wavelength-selective filter includes:
         input ports configured to couple to the first optical waveguide and the second optical waveguide;
         a propagation region configured to convey the first optical signal and the second optical signal;
         an optical device configured to image and diffract the first optical signal and the second optical signal using a reflective geometry; and
         the outputs ports, optically coupled to diffraction orders of the optical device, configured to provide the output optical signals having the wavelengths in the first optical signal and the second optical signal; and
      optical detectors, optically coupled to the wavelength-selective filter, configured to provide electrical signals corresponding to the output optical signals, wherein a given optical detector is optically coupled to at least the given output port and is configured to provide a given electrical signal corresponding to at least the given output optical signal.

8. The system of claim 7, wherein an incidence angle associated with a given diffraction order of the optical device is different than a diffraction angle associated with the given diffraction order.

9. The system of claim 7, wherein the optical device includes a diffraction grating on a curved surface.

10. The system of claim 7, wherein the optical device includes an echelle grating.

11. The system of claim 7, further comprising:
a substrate;
a buried-oxide layer disposed on the substrate; and
a semiconductor layer disposed on the buried-oxide layer, wherein the first optical waveguide and the second optical waveguide are included in the semiconductor layer.

12. A method for providing output optical signals, wherein the method comprises:
receiving an input optical signal having two orthogonal polarization components and multiple wavelengths;
using a polarizing splitting grating coupler (PSGC), splitting the two orthogonal polarization components into a first optical signal having a transverse-electric (TE) mode and a second optical signal having the TE mode, and coupling the first optical signal to a first optical waveguide and the second optical signal to a second optical waveguide;
using a wavelength-selective filter, providing output optical signals having the wavelengths in the first optical signal and the second optical signal, wherein a given output optical signal has a given wavelength in one of the first optical signal and the second optical signal, wherein the wavelength-selective filter includes:
input ports configured to couple to the first optical waveguide and the second optical waveguide;
a propagation region configured to convey the first optical signal and the second optical signal;
an optical device configured to image and diffract the first optical signal and the second optical signal using a reflective geometry; and
the outputs ports, optically coupled to diffraction orders of the optical device, configured to provide the output optical signals having the wavelengths in the first optical signal and the second optical signal; and
using optical detectors, outputting electrical signals corresponding to the output optical signals, wherein a given electrical signal corresponds to at least the given output optical signal.

* * * * *